No. 681,099. Patented Aug. 20, 1901.
A. BULL.
METHOD BY WHICH SEVERAL TELEGRAPHIC MESSAGES CAN BE TRANSMITTED AT THE SAME TIME THROUGH ONE CONDUCTOR OR BY WIRELESS TELEGRAPHY.
(Application filed May 8, 1900. Renewed July 1, 1901.)
(No Model.) 2 Sheets—Sheet 1.
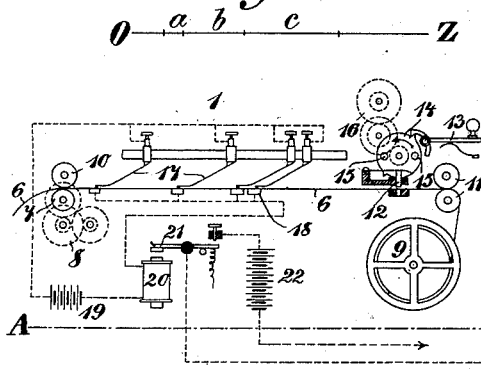
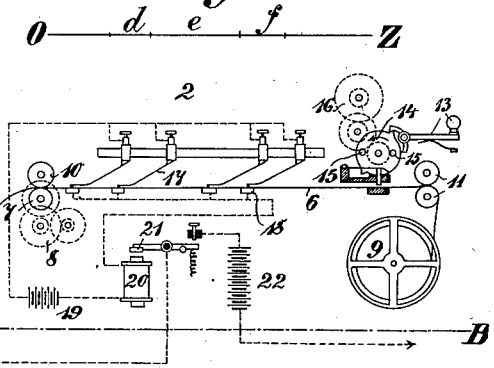
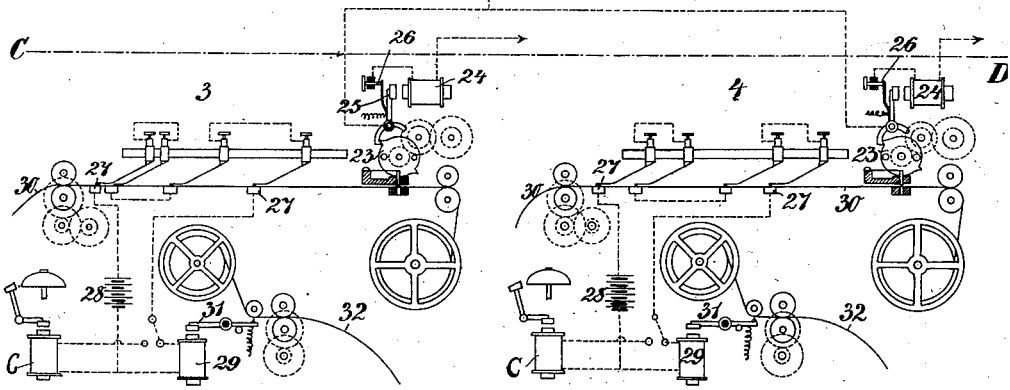

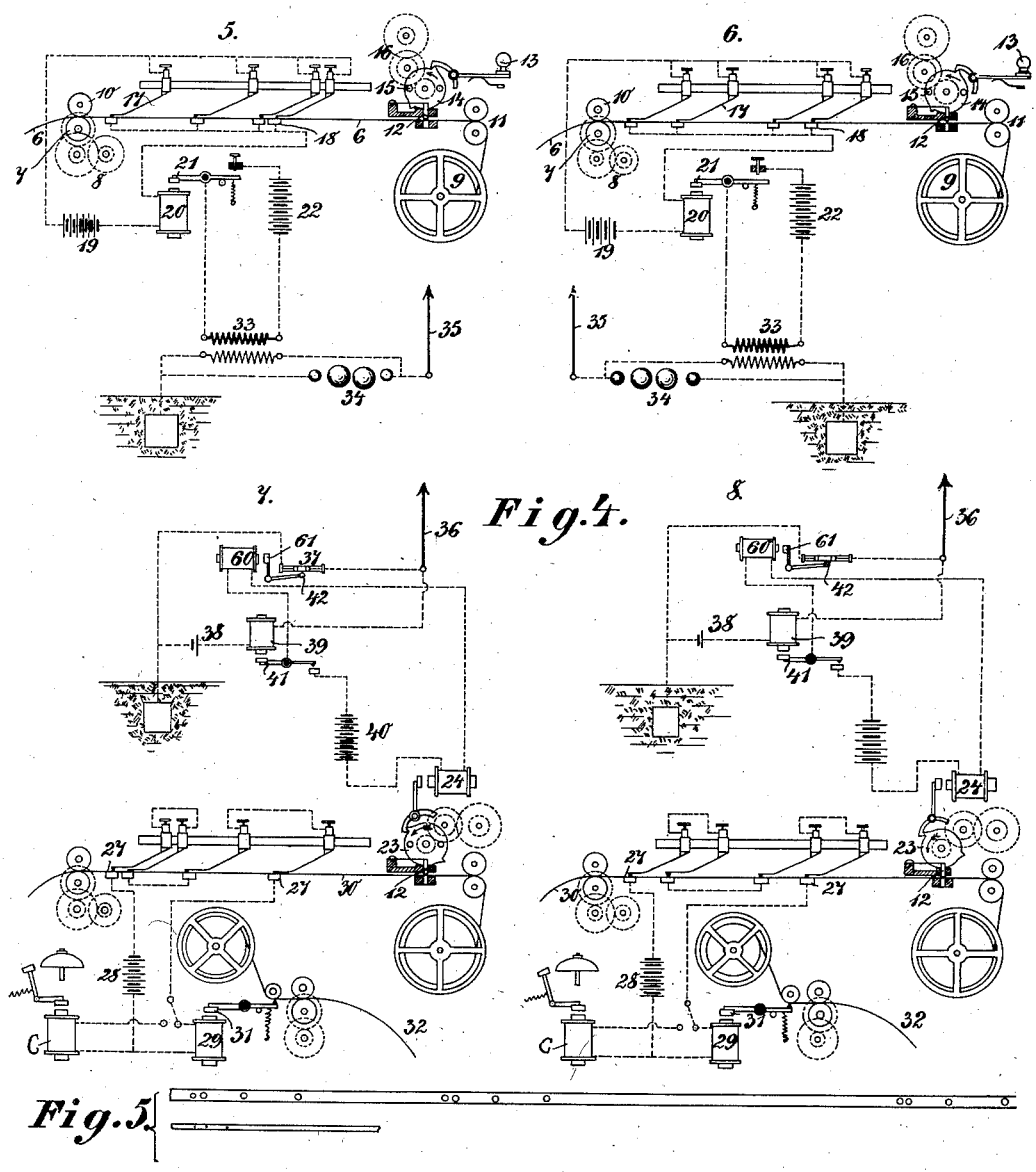

UNITED STATES PATENT OFFICE.

ANDERS BULL, OF COLOGNE, GERMANY.

METHOD BY WHICH SEVERAL TELEGRAPHIC MESSAGES CAN BE TRANSMITTED AT THE SAME TIME THROUGH ONE CONDUCTOR OR BY WIRELESS TELEGRAPHY.

SPECIFICATION forming part of Letters Patent No. 681,099, dated August 20, 1901.

Application filed May 8, 1900. Renewed July 1, 1901. Serial No. 66,770. (No specimens.)

*To all whom it may concern:*

Be it known that I, ANDERS BULL, a subject of the King of Sweden and Norway, residing at Cologne-on-the-Rhine, in the Kingdom of Prussia, German Empire, have invented certain new and useful Improvements in Methods by which Several Telegraphic Messages can be Transmitted at the Same Time Through One Conductor or by Wireless Telegraphy, (for which I have applied for patent in Germany, B. 25,034, II/21 $a^1$, dated June 28, 1899,) of which the following is a specification.

This invention relates to a method by which several telegraphic messages can be simultaneously sent along a single conductor or with spark or wireless telegraphy by suitable systems of apparatus. This object is attained by transmitting the telegraphic messages exclusively by means of series. Each of these series consists in the case of wire telegraphy of a certain number of short continuous-current impulses and in spark telegraphy of a number of wave impulses following each other at definite intervals of time. By suitably choosing the intervals of time, and, indeed, only by this means, various series can be formed. It is possible to so adjust the pairs of apparatus that each transmitter only transmits one kind of series and so that the corresponding receiver only answers to the one series.

In order to better explain the method, several apparatus suitable for obtaining the object desired are described below in their simplest form.

Figure 1 represents what is meant by a "series," the line O Z representing the time and the marks thereon the impulses. Fig. 2 represents another series in the same manner. Fig. 3 is a diagrammatic representation of two pairs of transmitting and receiving apparatus for wire telegraphy and their connections. Fig. 4 is a diagrammatic representation of two pairs of transmitting and receiving apparatus for spark telegraphy. Figs. 5 and 6 represent the bands marked with different series.

To simplify the matter, I first describe an apparatus that is suitable for wire telegraphy. In Fig. 3 two transmitters 1 and 2 are shown, which are connected by a common conductor 5 and by the earth with corresponding receivers 3 and 4. Of these apparatus 1 and 3 can form one pair and 2 and 4 the other. Each of these pairs is adjusted for a special series. For example, the pair 1 3 for the series *a b c* (shown in Fig. 1) and the pair 2 4 for the series *d e f*. (Shown in Fig. 2.) The transmitter consists in the present form of a paper ribbon 6, which is wound off from the drum 9 with an almost-constant velocity by the metal roller 7, which is uniformly driven by the mechanism 8. By the pressure of the rubber roller 10 the ribbon is prevented from slipping on the roller 7. After leaving the drum 9 the ribbon first passes between the guide-rollers 11 and then through a perforating apparatus, where an elastically-supported perforator 12 is quickly lowered on pressing down the key 13, and the ribbon 6 is thus perforated. The descending movement of the perforator 12 is obtained by the projections 15 on the ratchet-wheel 14, which projections strike on the spring supporting the perforator. The ratchet-wheel is driven by the toothed wheels 16 and always has the tendency to rotate, which it can, however, only do when the key 13 is pressed. Further, the ratchet-wheel can only rotate through one hundred and eighty degrees on each depression of the key, so that only one hole is made in the ribbon. In the same line with the perforating device a number of adjustable contact-springs 17 are arranged. The ends of these springs are rounded off and press upon the ribbon 6. As support for the ribbon a like number of metal pieces 18 are provided. Each hole made by the perforator in the ribbon must pass beneath the springs when the band is moved. Where there is no hole, the springs 17 are insulated from the metal supports 18 by the ribbon 6, whereas at every hole contact is made. All the springs are connected together and with the one pole of a source of electricity 19, the metal supports 18, which are also connected together, being connected with the other pole of the same. In this circuit there is a relay 20. When one of the springs comes into contact with its support, the current passes through the relay 20, the armature 21 is attracted, and the circuit of the line-battery 22 is closed, so that a current passes momentarily into the conductor 5. As the paper ribbon 6 is moved with a constant velocity, the impulses produced by each hole in the ribbon will be repeated at intervals corresponding to the distances between the ends of the springs 17.

The arrangement of the receiver differs from the transmitter by the fact that the ratchet-wheel 23, which actuates the perforator, is released by a magnet 24, situated in the main circuit, instead of by a key. When the main circuit is closed by the contact between the springs 17 and supports 18, the armature 25 is attracted and the ratchet-wheel released. By the attraction of the armature the circuit is broken at 26, so that the armature springs back into its first position and the ratchet-wheel is again stopped. This interruption is provided for the purpose of preventing the second impulse from being lost when two impulses follow each other rapidly.

While in the transmitter the contacts are connected in parallel circuit, in the receiving apparatus the springs and supports are connected in series. The first and last metal pieces 27 are connected with the poles of a battery 28, the current of which passes through a coil of a common Morse or similar telegraphic apparatus. A current can only pass through this circuit when each of the four springs are in contact with their supports—that is, when there is a hole in the ribbon underneath each spring. As the paper ribbon 30 is moved with a constant velocity, the distances between the holes which are made in the ribbon when the series of impulses follow each other correspond with the intervals of the original impulses. When the ends of the springs are arranged at the same distances apart as the holes are made, all the ends will simultaneously make contact each time the said series occurs, and only then. The current thus closed passes from the battery 28 through the magnets 29, so that the armature 31 is attracted and a point is made on the paper ribbon 32. The ribbon 32 is slowly wound off, as is usual in the Morse apparatus.

It should be observed that the two mechanisms driving the paper ribbons 6 and 30 do not need to move synchronously nor with a quite constant velocity, but a certain variation is admissible, the amount of which is dependent on the distance between the contact-springs and the size of the holes made.

The connections for spark telegraphy (shown in Fig. 4) only differ from those just described in the transmission devices—that is, in the parts represented between the lines A B and C D of Fig. 3. In this case the armature of the relay 20 momentarily closes the circuit for the spark-inductor 33. A discharge between the balls 34, which are connected in the usual manner with the earth and an air-conductor 35, takes place and a wave impulse is obtained. At the receiving-station the wave impulses meet the air-conductor 36, which is connected with the coherer 37. The latter is connected in series with the battery 38 and the relay 39. As soon as the waves meet the wire and the coherer allows the current to pass, the circuit of the battery 40 is closed by the attraction of the armature 41, whereupon the magnet 24 releases, as before, the ratchet-wheel 23, while the hammer 42 is actuated by the attraction of the armature 61 by the electromagnet 60, so that the relay 39 releases its armature. For each wave impulse a hole is punched with this apparatus also. The further operation is the same as that above described.

Upon each depression of the key 13 at the transmitting-station a point is made on the paper ribbon 32 at the receiving-station. Two points printed close together can be regarded as equivalent to a stroke of the Morse alphabet, and the alphabet for this system can be made in this manner. When several transmitting apparatus are used at the same time, each receiving apparatus will receive all the impulses from the former. If each series consists of $n$ impulses, $n\,l$ transmitting apparatus can be used, for, as will be evident, by suitably choosing the time intervals for the different series a number of impulses could never occur by chance with this number of apparatus in the series required for the receiving apparatus.

The various characteristic series in accordance with which the separate pairs of apparatus have to be adjusted must be of such a character that all the intervals contained in the same and the sum of several consecutive intervals are of different lengths. If, for example, the intervals of the series for three pairs of apparatus are represented by $a\,b\,c$, $d\,e\,f$, $g\,h\,i$, then none of the following intervals should be of same length: $a\,b\,c$, $d\,e\,f$, $g\,h\,i$, $a\,b\,b\,c$, $d\,e\,e\,f$, $g\,h\,h\,i$, $a\,b\,c$, $d\,e\,f$, $g\,h\,i$. Further, the interval of time between two identical series—that is, between each depression of the keys of a transmitting apparatus—should be longer than the time occupied by the longest series, so that the interval of time between the last impulse of the first series and the first impulse of the next following series is greater than the duration of the longest series. When both of these conditions are complied with, the series of a transmitting apparatus can never present two holes for another series. In order to admit of the possibility of the correspondence of two complete series of $n$ impulses, $n$ transmitters would have to be operated at the same time, and with $n\,l$ transmitters no such correspondence could occur. This condition does not decrease the efficiency of the apparatus, as the intervals can be chosen so small as to permit of the most rapid operation of the instrument.

The call takes place in as simple a manner as the telegraphing, a call apparatus C being switched into the circuit instead of the recorder.

What I claim, and desire to secure by Letters Patent of the United States, is—

1. The herein-described method of transmitting several telegraphic messages simultaneously, consisting in transmitting and receiving each sign by means of series, each series consisting of a predetermined number of short impulses following one another at different intervals of time, and the intervals between the successive identical series being greater than the length of one of said series; the several messages simultaneously transmitted being transmitted by distinct or different series so that only the messages transmitted by the proper predetermined series will be received at the desired station, all substantially as and for the purpose set forth.

2. The herein-described method of simultaneously transmitting several telegraphic messages, consisting in transmitting and receiving each sign by means of series, each of which series consists of a predetermined number of short impulses following one another at different intervals of time; each message being transmitted by signs of a peculiar and distinct series, the intervals between successive identical series being so proportioned to the length of one of such series as to prevent confusion thereof, whereby only the message transmitted by the proper predetermined series will be received or recorded at the desired station, the action of the receiver at such station not being interfered with by the arrival or passage of series of other forms simultaneously transmitted, all substantially as and for the purpose set forth.

In testimony whereof I have hereunto set my hand in the presence of two witnesses.

ANDERS BULL.

Witnesses:
   F. A. HERENDEEN,
   CAMILLE GUNDMANN.